(12) United States Patent
Keir et al.

(10) Patent No.: US 7,462,319 B2
(45) Date of Patent: Dec. 9, 2008

(54) INJECTION MOLDING MACHINE APPARATUS AND METHOD WITH MOVING PLATEN INJECTION AND EJECTION ACTUATION

(75) Inventors: William Steven Keir, Aurora (CA); Bruno Giuseppe Sodaro, Alton (CA)

(73) Assignee: Husky Injection Molding Systems Ltd, Bolton, ON (CA)

(*) Notice: Subject to any disclaimer, the term of this patent is extended or adjusted under 35 U.S.C. 154(b) by 843 days.

(21) Appl. No.: 11/010,501

(22) Filed: Dec. 13, 2004

(65) Prior Publication Data
US 2006/0125148 A1 Jun. 15, 2006

(51) Int. Cl.
*B29C 45/16* (2006.01)
*B29C 45/18* (2006.01)
*B29C 45/40* (2006.01)

(52) U.S. Cl. .................. 264/328.8; 264/344; 425/130; 425/556; 425/595

(58) Field of Classification Search .............. 264/328.1, 264/344, 328.8; 425/595, 556, 130
See application file for complete search history.

(56) References Cited

U.S. PATENT DOCUMENTS

| | | | |
|---|---|---|---|
| 3,015,849 A | * | 1/1962 | Mittelstadt et al. .......... 425/556 |
| 3,550,207 A | * | 12/1970 | Strauss ....................... 425/156 |
| 4,080,147 A | | 3/1978 | Dumortier |
| 4,609,516 A | | 9/1986 | Krishnakumar et al. |
| 4,990,301 A | | 2/1991 | Krishnakumar et al. |
| 5,512,223 A | * | 4/1996 | Morikita ..................... 264/71 |
| 5,662,856 A | * | 9/1997 | Wunderlich ............... 264/297.2 |
| 5,798,069 A | | 8/1998 | Bertschi et al. |
| 6,152,721 A | | 11/2000 | Schad et al. |
| 6,540,496 B1 | | 4/2003 | Schad et al. |

FOREIGN PATENT DOCUMENTS

| | | | |
|---|---|---|---|
| JP | 60-190829 | * | 9/1985 |
| JP | 6-238722 | * | 8/1994 |
| WO | WO 02/058908 A1 | | 8/2002 |

OTHER PUBLICATIONS

International Search Report for PCT/CA2005/001675, dated Jan. 24, 2006, three pages, related to the above-identified US patent application.

* cited by examiner

*Primary Examiner*—Jill L Heitbrink

(57) ABSTRACT

Injection molding machine apparatus and method with moving platen injection and ejection actuation is provided for an injection molding machine clamp assembly configured to clamp a relatively movable platen to a relatively stationary platen. Injector structure is coupled to the relatively movable platen and is configured to actuate a molten material injection structure when the relatively movable platen and the relatively stationary platen are closed. Ejector structure is coupled to the relatively movable platen and is configured to actuate a molded article ejection structure when the relatively movable platen and the relatively stationary platen are open.

16 Claims, 7 Drawing Sheets

INJECTION MOLDING MACHINE APPARATUS AND METHOD WITH MOVING PLATEN INJECTION AND EJECTION ACTUATION

BACKGROUND OF THE INVENTION

1. Field of the Invention

The present invention relates to an improved injection molding machine apparatus and method in which the moving platen is configured to perform (i) molten material injection actuation and (ii) molded article ejection actuation.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same gate. Some coinjection molding systems include a moving platen assembly which is coupled to a second hot runner shooting pot injection unit in addition to an ejector plate mechanism. See, for example, the following:

- U.S. patent application Ser. No. 10/879,575 entitled APPARATUS AND METHOD FOR ACTUATION OF INJECTION MOLDING, SHOOTING POTS;
- U.S. patent application Ser. No. 10/879,576 entitled INJECTION MOLDING MACHINE SHOOTING POT WITH INTEGRAL CHECK VALVE;
- U.S. patent application Ser. No. 10/879,581 entitled INJECTION MOLDING MACHINE SPIGOTTED SHOOTING POT PISTON;
- U.S. patent application Ser. No. 10/879,621 entitled APPARATUS AND METHOD FOR SEALING INJECTION UNIT AND SPRUE;
- U.S. patent application Ser. No. 10/879,582 entitled CONTROL SYSTEM FOR A DYNAMIC FEED COINJECTION PROCESS;
- U.S. patent application Ser. No. 10/880,494 entitled HOT RUNNER COINJECTION NOZZLE WITH THERMALLY SEPARATED MELT CHANNELS;
- U.S. patent application Ser. No. 10/880,493 entitled COINJECTION MOLDING COOLED SHOOTING POT CYLINDER; and
- U.S. patent application Ser. No. 10/887,353 entitled APPARATUS AND METHOD FOR INJECTION MOLDING SHOOTING POT WEDGE FEATURE.

However, none of the above U.S. patent documents provides a molding system in which the molten material injection functions and molded article ejection functions are advantageously combined in a time and space efficient manner.

U.S. Pat. Nos. 6,152,721 and 6,540,496 to Schad both disclose a coinjection molding machine having an injection actuation mechanism attached to the stationary platen that operates injector rods that pass through the stationary platen to actuate hot runner shooting pots in the mold. There is no disclosure of how the hot runner shooting pot actuation and a molded part ejection actuation could be configured from the machine's moving platen side.

Thus, what is needed is an injection molding method and apparatus in which both a molten material injection function and a molded part ejection function are operated from a moving platen side of the injection molding machine. This conserves space in the machine's footprint by co-locating driving structure, and reduces cycle time by using the movement of the moving platen to enhance injection and ejection.

SUMMARY OF THE INVENTION

It is an advantage of the present invention to provide an injection molding structure and function whereby molten material injection actuation and molded article ejection actuation are advantageously operated from the moving platen side of the molding machine.

According to a first aspect of the present invention, a unique combination of structure and/or steps is provided for an injection molding machine clamp assembly configured to clamp a relatively movable platen to a relatively stationary platen. Injector structure is coupled to the relatively movable platen and is configured to actuate a molten material injection structure when the relatively movable platen and the relatively stationary platen are closed. Ejector structure is coupled to the relatively movable platen and is configured to actuate a molded article ejection structure when the relatively movable platen and the relatively stationary platen are open.

According to a second aspect of the present invention, a unique combination of structure and/or steps is provided for molding machine apparatus including an ejector plate configured to be coupled to a moving platen, and configured to be movable with respect thereto. An ejector rod is configured to be moved by the ejector plate, and is configured to remove a molded article from an mold part. An injector plate is configured to be coupled to the moving platen, and is configured to be movable with respect thereto. The injector plate is configured to be independently movable with respect to the ejector plate, and is configured to be movable in the same direction as the ejector plate. An injector rod is configured to be moved by the injector plate, and is configured to actuate a shooting pot piston.

According to a third aspect of the present invention, a unique combination of structure and/or steps is provided for molding machine apparatus including a movable clamp column, and an injector piston disposed at a distal end of the clamp column. The injector is configured to be movable with respect to the clamp column and in the same direction. An ejector piston is disposed at a distal end of the injector piston, and is configured to be movable with respect thereto and in the same direction. Preferably, the ejector piston is nested within the injector piston, which is nested within the clamp piston.

According to a fourth aspect of the present invention, a unique combination of steps is provided for a method of operating a molding machine, including the steps of: (i) driving an injector rod through a hole in a moving platen to cause a shooting pot to be discharged when the moving platen is clamped to a fixed platen; and (ii) driving an ejector rod through another hole in the moving platen to cause a molded article to be ejected from a mold part when the moving platen is separated from the fixed platen.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic coinjection molding machine injects two different plastic melts into a mold through two different hot runner systems. The second injection unit is mounted to a movable portion of the mold, and is supplied with the second plastic melt. However, the present invention will also find applicability in any injection molding process (including single plastic molding, thixomolding, composite molding, etc.), which may benefit from being able to efficiently perform molten material injection and molded part ejection.

2. The Structure of the Preferred Embodiments

Figure 1:
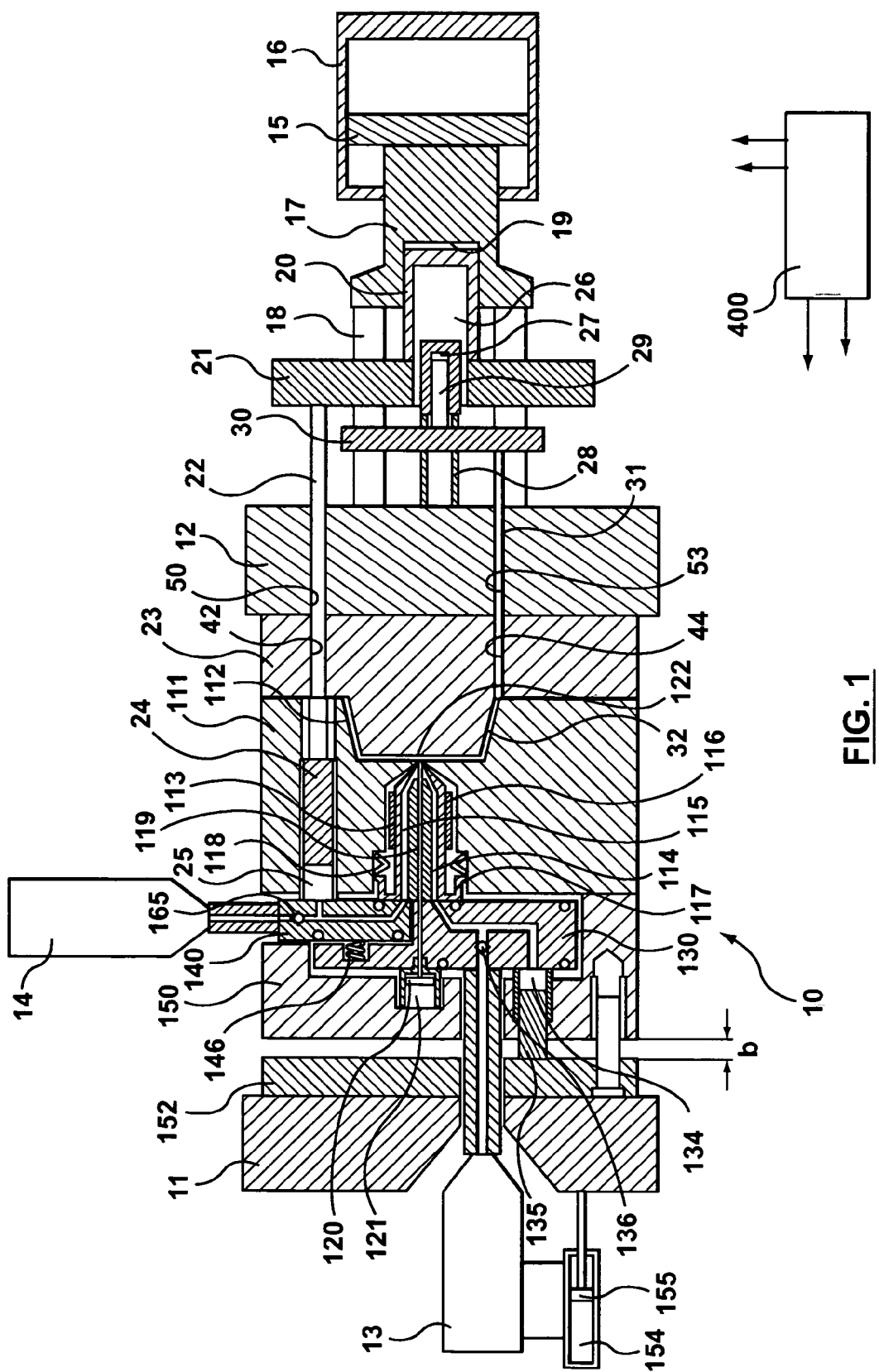
FIG. 1 is a schematic view of the injection molding machine according to a first embodiment of the present invention, in the mold closed position.
Figure 2:
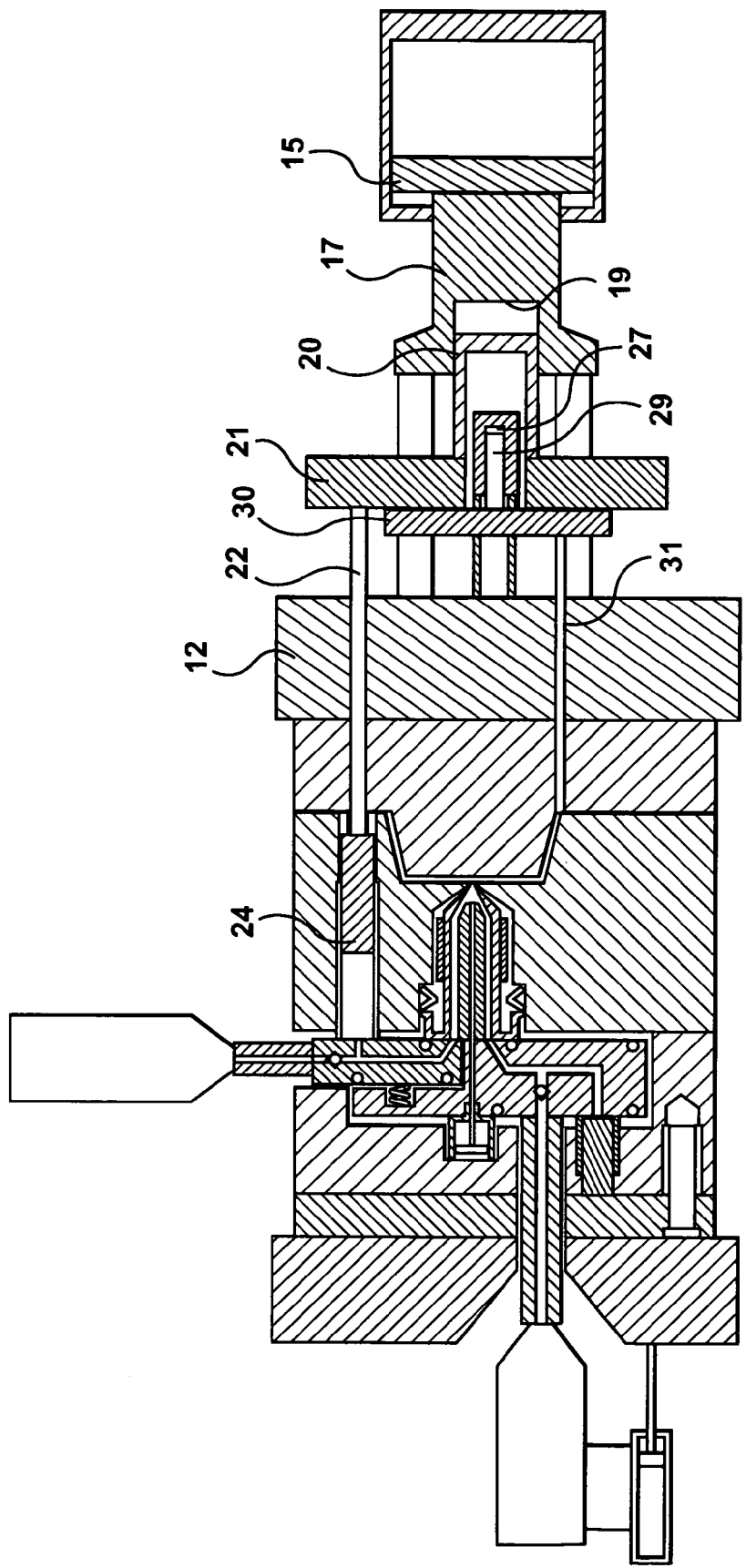
FIG. 2 is a schematic view of the FIG. 1 embodiment in the injection complete position.

FIGS. 1-7 are schematic section views of a coinjection hot runner mold, showing various parts of the machine at various stages during a molding cycle which produces a molded part having multilayered walls. The mold includes a coinjection hot runner mold 10, mounted between a stationary platen 11 and a moving platen 12 of a coinjection molding machine. The machine also includes a first injection unit 13 and a second injection unit 14 that may be mounted directly on the mold 10 or, in alternate configurations as described in the above-referenced copending U.S. patent applications. The clamp assembly of the machine includes the aforementioned platens and a clamp piston 15 operating within a clamp cylinder 16. The piston 15 is connected via a column 17 and standoffs 18 to the moving platen 12, such that the clamp piston 15 is operable to close and clamp the mold, as shown in FIG. 2.

A coinjection hot runner nozzle 113 includes a first melt channel 114 (for conveying a plastic resin "A") and a second melt channel 115 (for conveying a different plastic resin "C"). The nozzle 113 is maintained at operating temperature by a heater 116, and is located in a cavity block 111 by a locating insulator 117. The nozzle 113 is preferably urged into sealing contact with a first hot runner manifold 130 and a second hot runner manifold 140 by spring pack 118. The nozzle 113 also contains a valve stem 119 that is actuated by piston 120 in cylinder 121 to open and close gate 122 that connects melt channels 114 and 115 to a mold cavity 112. See U.S. patent application Ser. No. 10/879,576.

The mold has two hot runner manifolds. The first hot runner manifold 130 handles the resin "A" and is maintained at optimum operating temperature for the resin "A" by heaters. Attached to the manifold 130 is a first sprue bushing that conveys the resin "A" from the first injection unit 13. Also attached to the manifold 130 is a first shooting pot 134 that contains a first shooting pot piston 135. The second hot runner manifold 140 handles the resin "C" and is maintained at optimum operating temperature for the resin "C" by further heaters. Attached to the manifold 140 is a second sprue bushing that conveys the resin "C" from the second injection unit 14. Also attached to manifold 140 is the second shooting pot 25 that contains the second shooting pot piston 24. As an example, the distance between the second shooting pot 25 and the nozzle 113 may be 60.0 mm.

The second manifold 140 is preferably spaced away from the first manifold 130, urged by a compensation element 146. Both of the manifolds 130 and 140 are preferably located in a manifold plate 150 that is bolted to the cavity block 111 by fastening means (not shown). Both of the manifolds 130 and 140 seal against the nozzle 113 such that their respective melt channels align and seal with their counterpart melt channels in the nozzle 113 to convey the resins "A" and "C", respectively, from the shooting pots 134 and 25 to the mold cavity 112 when the valve stem 119 is open and the respective shooting pot pistons are actuated.

When the first injection unit 13 charges the first shooting pot 134 with the resin "A", the entry of the resin into the shooting pot displaces the manifold/cavity block assembly away from the manifold backing plate 152 a distance of "b", as shown in FIG. 1. The actuation of the machine clamp piston 15 via the column 17 that is coupled to the moving platen 12 via standoffs 18 causes the mold assembly to move towards the stationary platen 11, thereby closing or taking up the distance "b", thus causing the first shooting pot piston 135 to inject the resin "A" from the first shooting pot 134 into the nozzle housing melt channel 114, and thereby into the mold cavity 112. A ball check valve 136 in the feed channel prevents backflow of the injected resin back into the first injection unit 13. The first injection unit 13 is maintained in sealing contact with the sprue bushing during these movements of the manifolds 130 and 140 and the cavity block 111 by means of a cylinder 154 that is connected to the first injection unit 13 and a piston 155 that is connected to the stationary platen 11.

The second shooting pot piston 24 is actuated by the injector rod (or other transmission structure) 22 that is connected to the injector plate 21 that is mounted behind the moving platen 12, or alternatively within the mold core half structure, and is moved by the injector piston 20 inside injector cylinder 19, or other injection actuation structure. Of course, in a multi-cavity mold, the injection actuation structure may move more than one of the injector rods 22, as depicted in FIGS. 4-7. The injector rod 22 is preferably co-axial with the second shooting pot piston 24, and parallel to a longitudinal axis of the nozzle 113.

When the second injection unit 14 charges the second shooting pot 25 with the resin "C", the entry of the resin into the shooting pot displaces the second shooting pot piston 24, the injector rod 22, and the injector plate 21 away from the second manifold 140. The forward movement of the injector plate 21 causes the injector rod 22 to advance the second shooting pot piston 24 and discharge the resin "C" from the second shooting pot 25 via the second manifold 140, the channel 115 in the nozzle 113, and into the mold cavity 112 via the open gate 122. A second ball check valve 165 in the feed channel prevents backflow of the injected resin into the second injection unit 14. The second injection unit 14 may be alternatively mounted atop the mold assembly and travel with the movable section of the mold, thereby maintaining its sealing contact with sprue throughout the molding cycle, but preferably is mounted alongside the first injection unit 13 and is connected via a hole in the stationary platen directly to a sprue extension attached to the second manifold.

The column 17 also includes the injector cylinder 19 and the injector piston 20 that is mounted on the injector plate 21. This structure is used to drive the injector plate 21, as will be described in more detail below. Also mounted on the injector plate 21 is the injector rod 22 that passes through a hole 50 in the moving platen 12 and a hole 42 in the core half of the mold 23, to actuate the second shooting pot piston 24 in the second shooting pot 25, to cause the metered amount of resin "C" contained therein to be injected into the mold cavity, as described above and in the above-referenced copending applications.

Figure 3:
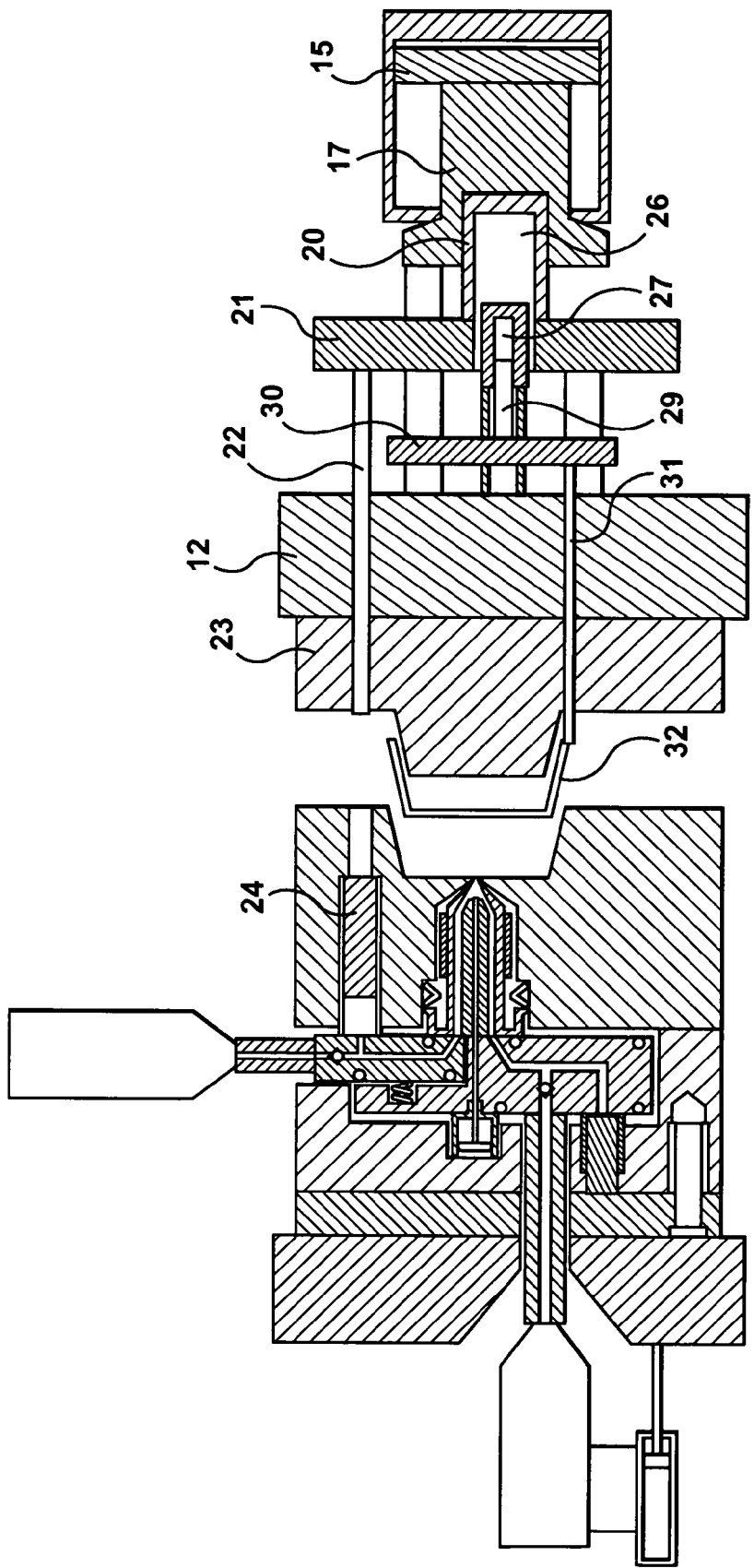
FIG. 3 is a schematic view of the FIG. 1 embodiment in the mold open position.

The injector plate 21 and the injector piston 20 contain a recess 26 to provide clearance to house an ejector cylinder 27 that is mounted via standoffs 28 to the moving platen 12. The ejector cylinder 27 contains an ejector piston 29 that is mounted on an ejector plate 30, to which is mounted an ejector rod 31 that passes through a hole 53 in the moving platen 12 and a hole 44 in the core half of the mold 23, to eject the molded part 32 off the mold core (as shown in FIG. 3).

It is an advantageous feature of the preferred embodiments that at least two of the piston/cylinder pairs 15/16, 20/19, 29/27 are coaxial and/or co-linear (or at least mounted in parallel). This provides nested or semi-nested structure which not only conserves space but enhances machine stability by applying two or more of the clamping/injecting/ejecting forces along a single line (or at least parallel lines). This will greatly reduce machine vibration and the wear-and-tear on these heavy moving parts. Another advantageous feature of the preferred embodiments is that the machine can be operated for monolayer (single material) molding or multilayer (multi material) molding without modification.

The operation of various platens and pistons may be controlled by a controller 400, which activates various pumps and valves to provide the appropriate fluid pressure to the pistons in a manner well known in the art. The controller 400 (which may be integrated as part of the injection molding machine) controls all timing and actuation sequences for the valve operation. Preferably, the controller comprises one or more processors, general purpose computers, Application Specific Processors, Digital Signal Processors, hard-wired circuitry, etc., with sufficient memory (ROM, RAM, disk, CD, etc.) to process one or more software programs containing code for carrying out the functions described herein.

The configuration is such that the injector plate 21 and the ejector plate 30 can be operated independently of each other at the appropriate time in the molding cycle to respectively effect injection of the material and ejection of the part, as will be described below.

Figure 4:
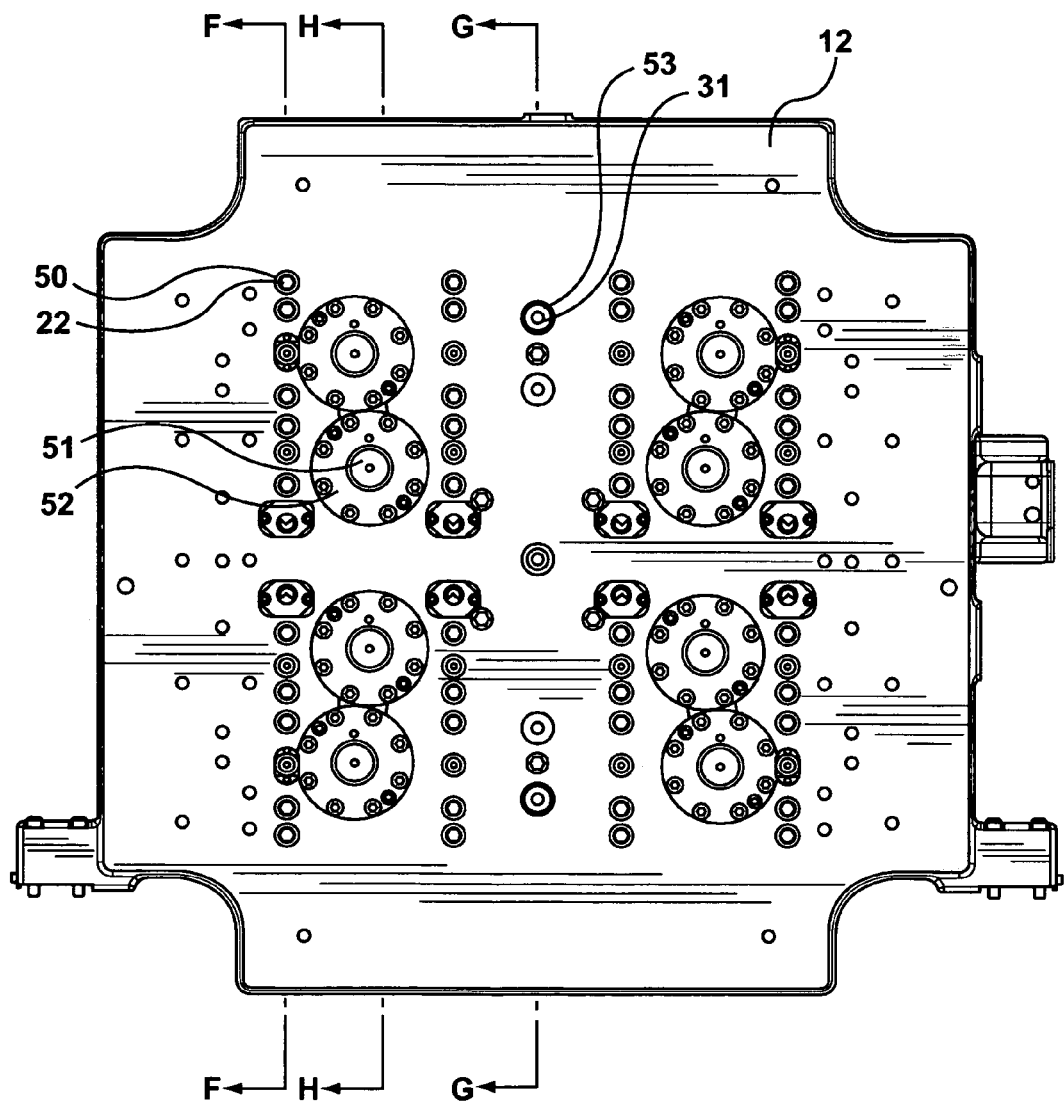
FIG. 4 is an end view of the moving platen of the FIG. 1 embodiment, from the mold mounting side.
Figure 5:
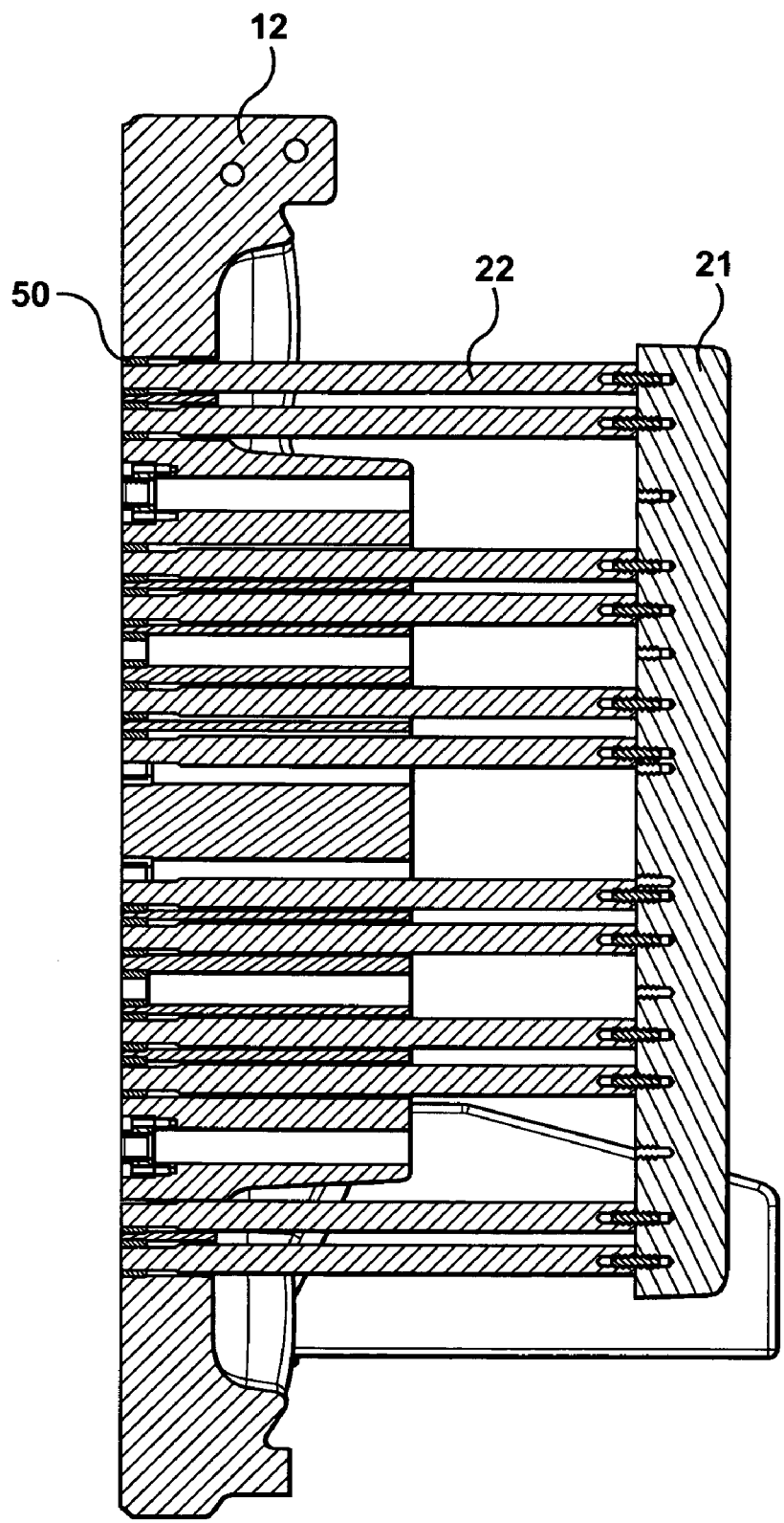
FIG. 5 is a cross-section view, taken along line F-F of FIG. 4, of the moving platen assembly.
Figure 6:
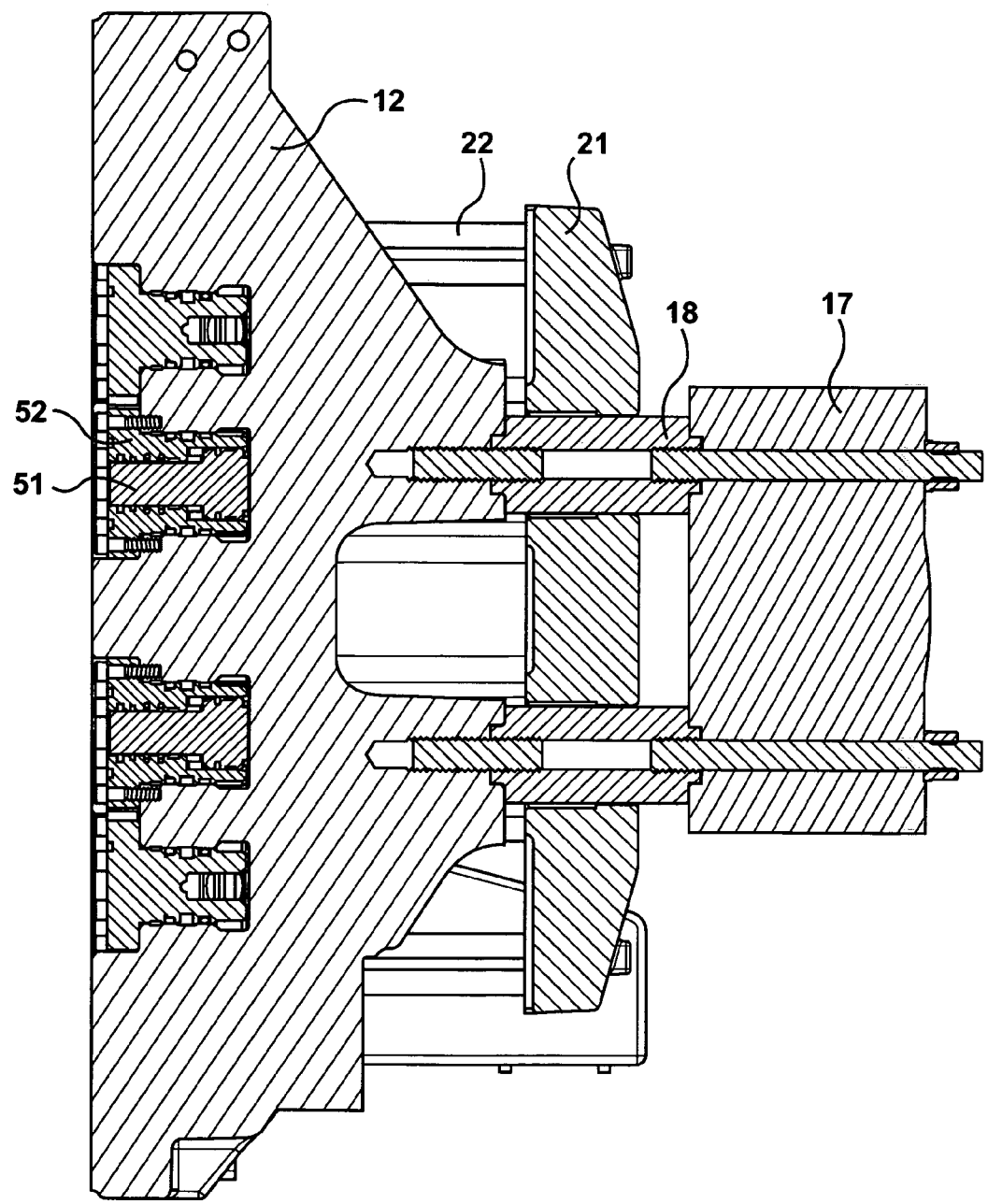
FIG. 6 is a cross-section view, taken along line H-H of FIG. 4, of the moving platen assembly
Figure 7:
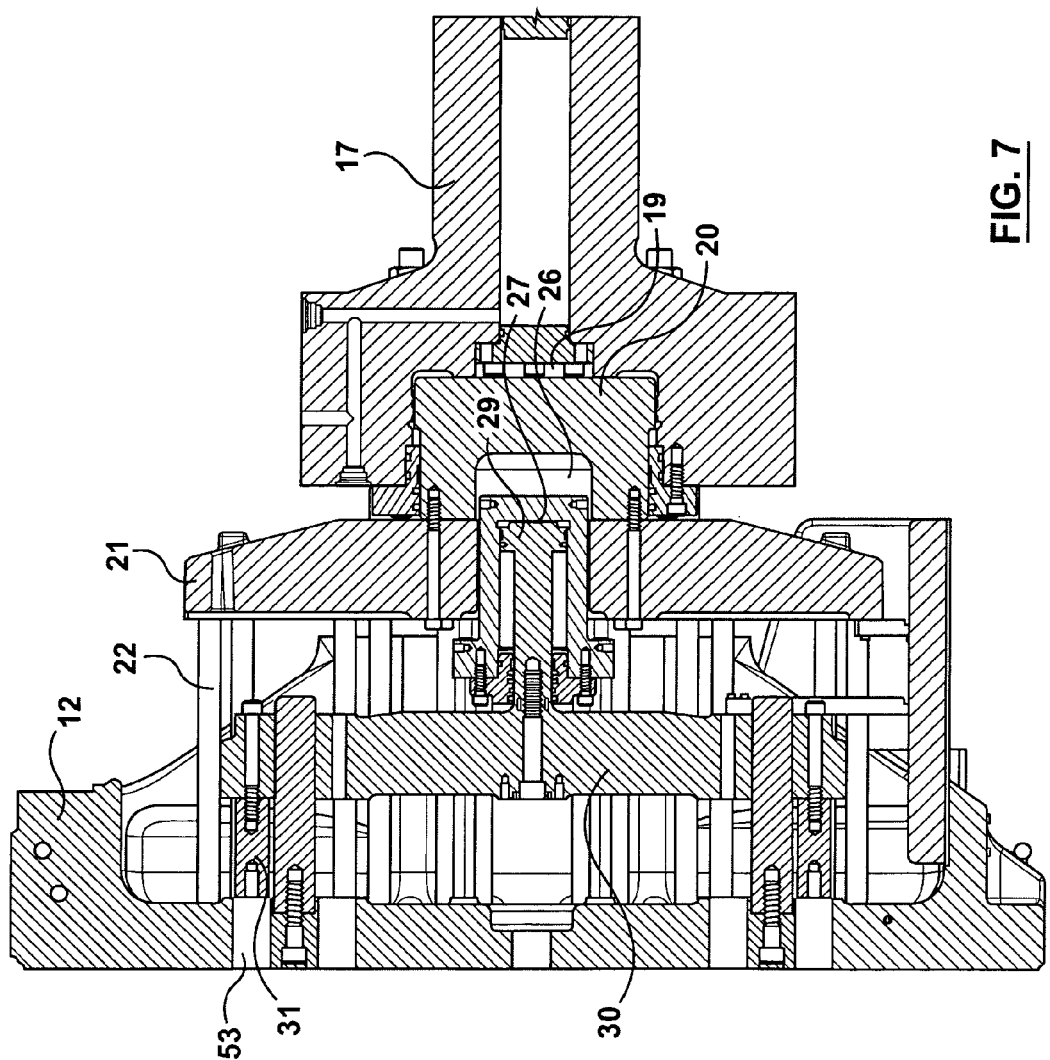
FIG. 7 is a cross-section view, taken along line G-G of FIG. 4, of the moving platen assembly

FIGS. 4-7 show, in more detail, that the injector plate 21 may carry multiple injector rods 22, and that the ejector plate 30 may carry multiple ejector rods 31. FIG. 4 shows a plan view depicting the injector holes 50 and the injector rods 22. Also shown are the ejector holes 53 and the ejector rods 31. In FIG. 5, each injector rod 22 passes through the corresponding hole 50 in the moving platen 12. In FIGS. 4 and 6, an ejector booster piston 51 may operate within a corresponding ejector booster cylinder 52, which are supplementary hydraulic ejectors used to assist the ejector pins 31. In FIG. 7, the ejector pins 31 are shown operating through the holes 53 in the moving platen 12. Preferably, mold ejector rods attach to the ejector pins 31, via the threaded hole in the end of ejector pin 31. Preferably, the mold rods are installed and connected to the mold's stripper plate so that the ejector rod 31 can be driven in both directions, to the left to push the parts off the mold, and to the right to return the stripper plate or ejector pins in the mold to the starting position.

3. The Process of the Preferred Embodiment

In operation, the molding cycle starts with the configuration shown in FIG. 1, that is, both of the shooting pots 134 and 25 are charged with their respective resins, the valve gate 119 is closed and, the mold is closed. FIG. 2 shows the next step in the molding cycle. The valve gate 119 has been opened by the piston 120, the machine clamp piston 15 has been actuated to move column 17, which in turn moves the moving platen 12, the mold core block 23, the mold cavity block 11, and the manifold assemblies 130 and 140 and the manifold plate 150 toward the stationary platen 11 until distance "b" has been taken up. This action displaces the first shooting pot piston 135 that injects the resin "A" in the first shooting pot 134 into the mold cavity 112 via the channel in the first manifold 130 and the first melt channel 114 in the nozzle 113. This metered first shot of resin "A" at least partially fills the mold cavity 112.

FIG. 2 also shows the next step in the molding cycle. The injector piston 20 actuates the injector plate 21 which drives one or more injector rods 22 to move one or more second shooting pot pistons 24 to inject the resin "C" through the second manifold 140 and the melt channel 115 into the cavity 112. This metered second shot of resin "C" flows within the earlier metered shot of resin "A" pushing it further along the cavity and setting up a multilayered wall in the part in known fashion. The combined amounts of resin injected so far preferably only partially fill the mold cavity 112.

During the next step in the molding cycle (not shown in the figures), the first injection unit 13 injects another shot of resin "A" directly through the sprue, the channel in the first manifold 130 and the first melt channel 114 in the nozzle 113 to fill and pack the mold cavity 112. After a brief interval of holding pressure, the valve stem 119 is closed by the piston 120 and the molded part is allowed to cool.

During the cooling of the part, the first shooting pot 134 is recharged with resin "A" by the first injection unit 13, feeding resin through the feed melt channel. Because the valve stem 119 is in the closed position, the incoming resin "A" can only flow into the first shooting pot 134, thereby displacing the first shooting pot piston 135 that in turn pushes the movable mold portion (comprising the core block 23, the cavity block 111, the manifolds 130 and 140, and the manifold plate 150) away from the manifold backing plate 152, thus creating the space "b" between them.

During the continued cooling of the part, the second shooting pot 25 is recharged with the resin "C" by the second injection unit 14, feeding resin through the feed channel. Because valve stem 119 is in the closed position, the incoming Resin "C" can only flow into the second shooting pot 25, thereby displacing the second shooting pot piston 24, that in turn pushes back the injector rod 22 and the injector plate 2. This recharging activity can take place simultaneously with the recharging of the "A" resin in the first shooting pot 134, since both of the manifolds 130 and 140 (and their respective injection units 13 and 14, respectively) can be operated independently. After the second shooting pot 25 is recharged, the injector plate 21 may be activated by injector piston 20 to continue to retract the injector rod 22 so that its distal end clears the cavity block 111 (as shown in FIG. 3). This is to ensure that the injector rod 22 is not exposed above the mold parting line when the mold is opened.

FIG. 3 shows the next step in the molding cycle. The part has cooled sufficiently to be ejected, so the mold is opened and the part 32 is ejected off the core block 23. In particular, as the mold is opened, the ejector piston 29 drives the ejector plate 30 leftward in the figure, moving the one or more ejector rods 31 to push the edge of the molded article 32 to separate it from the core block 23. The molded article 32 typically drops into a chute or another conveyor mechanism (such as a robot) removes the molded article(s) in a conventional manner. Thereafter, the ejector piston 29 is actuated in the opposite direction to retract the ejector rods(s) 31 within the core block 23 so that any processing robot(s) can access the space between the opened mold parts. Note that the injector rod 22 has also been retracted to clear the parting line so that any processing robot may enter between the open mold halves to pick up the ejected part or perform other mold operations, if necessary. Both of the shooting pots 134 and 25 have been re-charged in the previous step and are ready for injection when the mold closes in the next step, which is the first step of the next molding cycle. As an example, the entire molding cycle may take about 12 seconds.

4. CONCLUSION

Advantageous features according to the present invention may include:

An injection molding machine clamp assembly that includes an injector actuator and an ejection actuator as part of the moving platen assembly.

A moving platen assembly that includes both a movable injector plate and a movable ejector plate with their respective motions operable independent of each other.

Thus, what has been described is a method and apparatus for an injection molding machine in which a molten material injection function and a molded part ejection function are both operated from a moving platen side of the machine, thereby conserving footprint space and reducing cycle time.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patent documents discussed above are hereby incorporated by reference into the Detailed Description of the Preferred Embodiment.

What is claimed is:

1. A molding machine apparatus, comprising:
    a stationary platen;
    a movable platen;
    a mold for producing a molded part having multilayered walls, the mold being mounted between the stationary platen and the movable platen;
    a first injection unit having a first hot runner manifold being coupled with the mold;
    a second injection unit having a second hot runner manifold being coupled with the mold;
    an injection molding machine clamp assembly being configured to clamp the movable platen to the stationary platen, the injection molding machine clamp assembly including:
        an injector structure being coupled to the movable platen and configured to actuate a molten material injection structure when the movable platen and the stationary platen are closed, the molten material injection structure being coupled with the second hot runner manifold; and
        an ejector structure being coupled to the movable platen and being configured to actuate a molded article ejection structure when the movable platen and the stationary platen are open.

2. The molding machine apparatus according to claim 1, wherein:
    said injector structure comprises:
        an injector cylinder;
        an injector piston disposed in said injector cylinder;
        an injector plate configured to be driven by said injector piston; and
        an injector rod configured to be driven by said injector plate.

3. The molding machine apparatus according to claim 2, wherein said ejector structure comprises:
    an ejector cylinder;
    an ejector piston disposed in said ejector cylinder;
    an ejector plate configured to be driven by said ejector piston; and
    an ejector rod configured to be driven by said ejector plate.

4. The molding machine apparatus according to claim 3, wherein:
    said ejector structure is configured to be independently operable from said injector structure.

5. The molding machine apparatus according to claim 4, wherein:
    said ejector plate and said injector plate are substantially parallel and are configured to move independently but parallel to each other.

6. The molding machine apparatus according to claim 3, wherein:
    the movable platen is coupled to said ejector structure and said injector structure, the movable platen having
    an ejector hole configured to accept said ejector rod therein, and the
    injector hole in said movable platen configured to accept said injector rod therein.

7. The molding machine apparatus according to claim 1 wherein:
    said ejector structure and said injector structure are configured to be coupled to the movable platen.

8. The molding machine apparatus according to claim 1, further comprising:
    a plurality of said ejector structures and a plurality of said injector structures.

9. The molding machine apparatus according to claim 1, wherein:
    said ejector structure and said injector structure are configured to move in the same direction as the movable platen.

10. A molding machine apparatus, comprising:
    an ejector plate configured to be coupled to a movable platen, and configured to be movable with respect thereto;
    an ejector rod configured to be moved by said ejector plate, and configured to remove a molded article from an mold part;
    an injector plate configured to be coupled to the movable platen, and configured to be movable with respect thereto, said injector plate being configured to be independently movable with respect to said ejector plate, and configured to be movable in the same direction as said ejector plate; and
    an injector rod configured to be moved by said injector plate, and configured to actuate a shooting pot piston;
    an ejector cylinder;

an ejector piston disposed in said ejector cylinder and configured to actuate said ejector rod;

an ejector cylinder; and an injector piston disposed in said injector cylinder and configured to actuate said injector rod.

11. The molding machine apparatus according to claim 10 wherein:

said ejector plate is disposed between said injector plate and the movable platen.

12. A molding machine apparatus, comprising:

a movable clamp column;

an injector piston disposed at a distal end of the movable clamp column and configured to be movable with respect thereto and in the same direction; and an ejector piston disposed at a distal end of the injector piston and configured to be movable with respect thereto and in the same direction.

13. The molding machine apparatus according to claim 12, wherein:

said ejector piston is nested within the distal end of said injector piston, and wherein said injector piston is nested within the distal end of said movable clamp column.

14. The molding machine apparatus according to claim 12, wherein:

the movable clamp column, the ejector piston, and the injector piston are all configured to be coupled to a movable platen.

15. The molding machine apparatus according to claim 12, further comprising:

an injector plate moved by said injector piston;

a plurality of injector rods moved by said injector plate;

an ejector plate moved by said ejector piston; and a plurality of ejector rods moved by said ejector plate.

16. The molding machine apparatus according to claim 15, wherein:

said plurality of ejector rods and said plurality of injector rods are movable within corresponding pluralities of holes in a movable platen.

* * * * *